July 29, 1947. W. A. MARSHALL, JR 2,424,764
CABIN PRESSURE CONTROL APPARATUS
Filed March 31, 1943 3 Sheets-Sheet 3
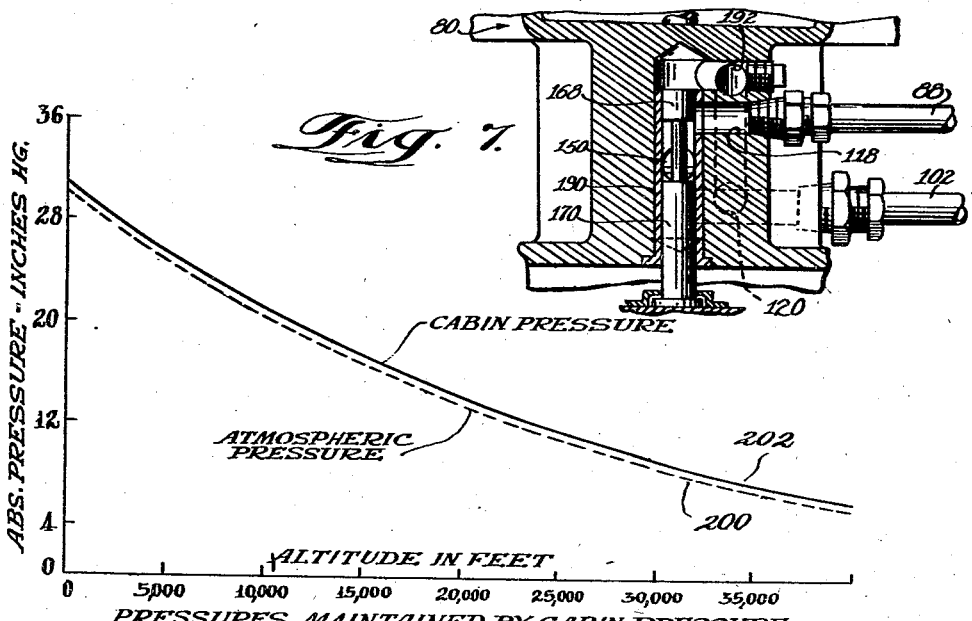
Fig. 7.
Fig. 5.
PRESSURES MAINTAINED BY CABIN PRESSURE
CONTROL VALVE WHEN CABIN IS NOT
SUPERCHARGED.
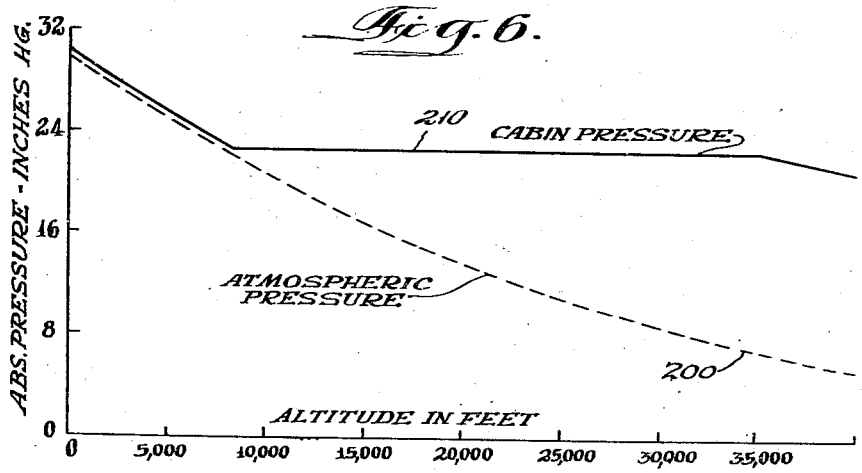
Fig. 6.
PRESSURES MAINTAINED BY CABIN PRESSURE
CONTROL VALVE WITH CABIN SUPERCHARGED.
Inventor
By William A. Marshall, Jr.
Williams, Bradbury & Hinkle
Attorneys.

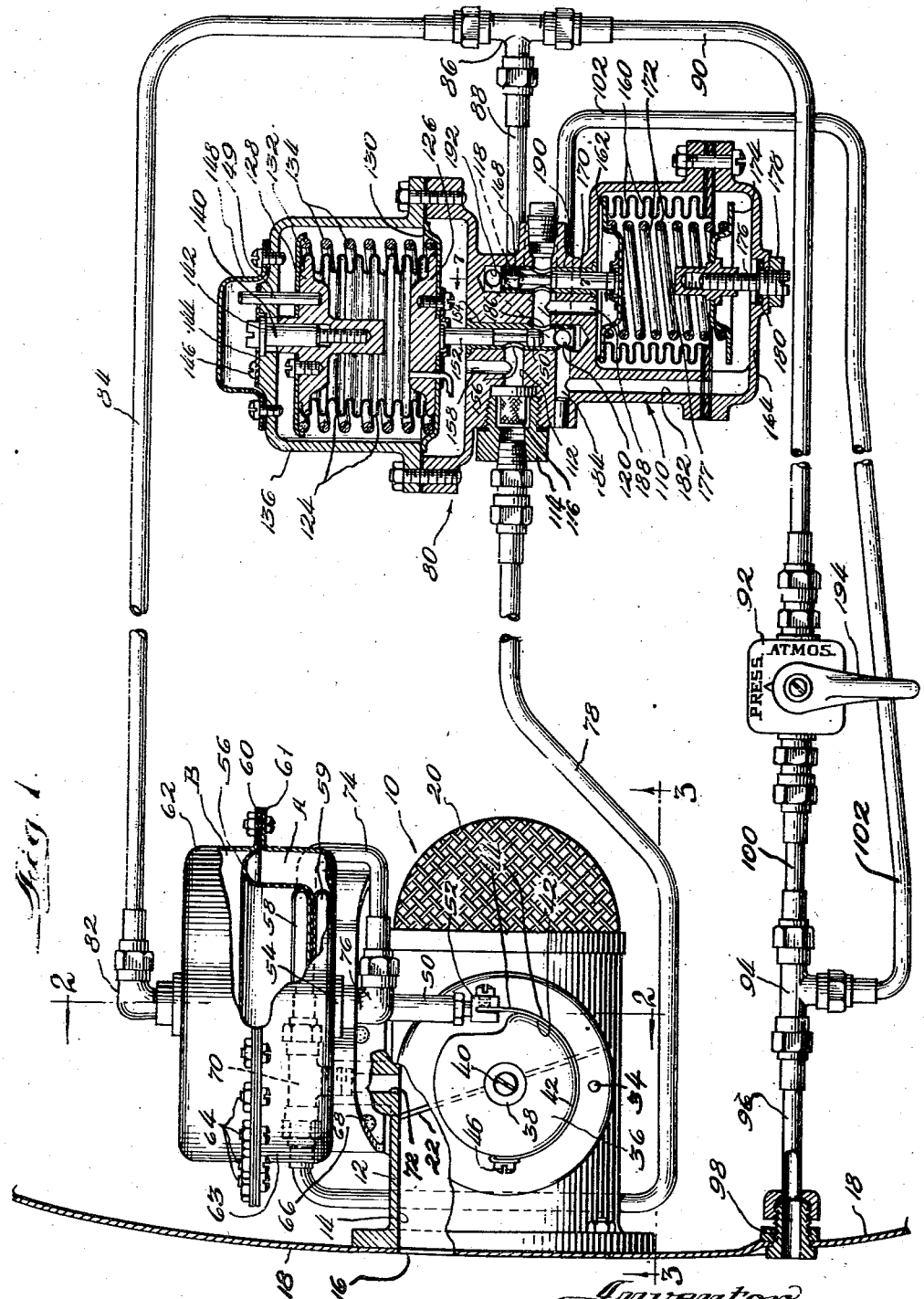

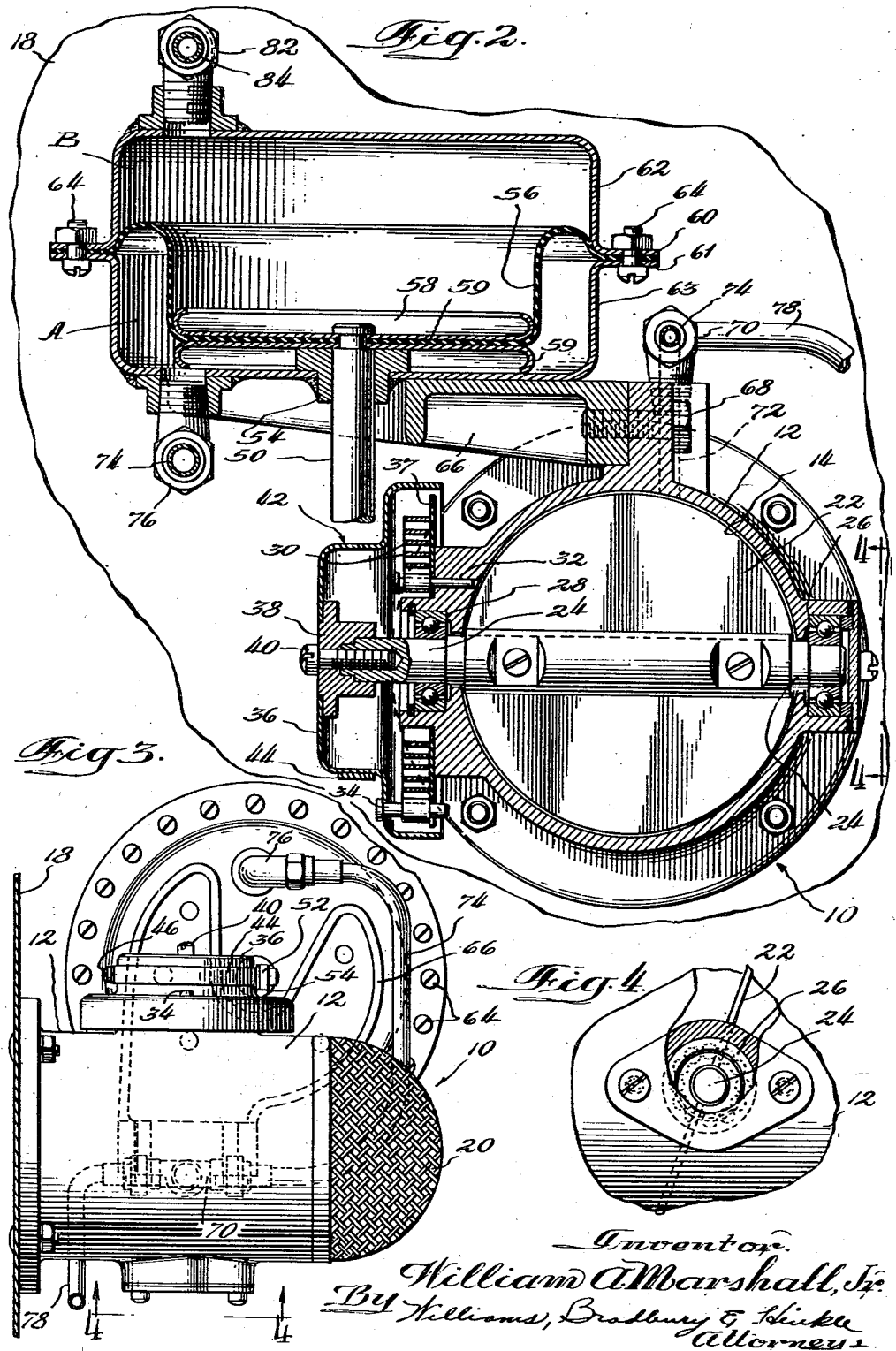

Patented July 29, 1947

2,424,764

UNITED STATES PATENT OFFICE 2,424,764

CABIN PRESSURE CONTROL APPARATUS

William A. Marshall, Jr., Oak Park, Ill., assignor to Stewart-Warner Corporation, Chicago, Ill., a corporation of Virginia Application March 31, 1943, Serial No. 481,209

1 Claim. (Cl. 98—1.5)

My invention relates generally to apparatus for controlling the pressure in an airplane cabin, in which the pressure is maintained above atmospheric pressure by a supercharger.

It is an object of my invention to provide an improved apparatus for maintaining a predetermined small pressure differential between the cabin and the atmosphere at low altitudes, to maintain the cabin supercharged at a predetermined absolute pressure at intermediate altitudes, and at the highest altitudes, to maintain a predetermined pressure differential between the cabin and the atmosphere.

A further object is to provide an improved supercharged cabin pressure control apparatus in which all of the mechanism is pneumatically operated, without the use of electrical controls, and which is capable automatically of maintaining predetermined relationships between atmospheric pressure and the pressure within the cabin.

A further object is to provide a supercharged cabin pressure control apparatus in which the operating and control units are sealed and may thus be located within the cabin or in any other convenient place, without regard to the surrounding air pressure.

A further object is to provide an improved supercharged cabin pressure control apparatus in which the air within the cabin may be rapidly and safely vented to the atmosphere in an emergency.

A further object is to provide an improved supercharged cabin pressure control apparatus in which a pressure differential between the cabin and the atmosphere is maintained at all times, and this pressure differential is utilized as the power source for the operation of the apparatus.

A further object is to provide an improved and simplified supercharged cabin pressure control apparatus which is reliable in operation, is light in weight, and may be economically manufactured.

Other objects will appear from the following description, reference being had to the accompanying drawings, in which:

Fig. 1 is a diagrammatic view, partly in section, illustrating the connections and relationships between the various parts of the apparatus;

Fig. 2 is a transverse sectional view of the cabin valve and its operating mechanism taken on the line 2—2 of Fig. 1;

Fig. 3 is a bottom plan view of the cabin valve mechanism taken on the line 3—3 of Fig. 1;

Fig. 4 is a fragmentary side elevational view taken on the line 4—4 of Fig. 3, portions thereof being shown in fragmentary section;

Fig. 5 is a graph showing the pressure maintained in the cabin at various altitudes when the cabin is not supercharged;

Fig. 6 is a similar graph showing the pressure within the cabin at various altitudes when the cabin is being supercharged; and Fig. 7 is a fragmentary cross sectional view taken on the line 7—7 of Fig. 6.

As best illustrated in Figs. 1 and 2, the control apparatus of my invention comprises a pressure controlling cabin valve 10, which comprises a body 12 having a duct 14 extending therethrough, one end of the duct being in communication with the atmosphere through a port 16 formed in the skin 18 of the cabin, while the other end is provided with a screen 20 and is thus open to the air pressure within the cabin.

A butterfly type valve 22, located in the duct 14, is suitably secured to a pintle 24 mounted for free rotation in anti-friction bearings 26 and 28, respectively. The valve 22 is normally maintained in closed position, as shown in Fig. 1, by a spiral spring 30, the inner end of which is anchored to a pin 32 secured in the valve body 12, while the outer end thereof is anchored to a pin 34 secured in a cup-shaped spring housing member 36. A spring backing plate 37 is held against rotation by the pin 32 and is peripherally notched to provide limit stops for engagement by the pin 34.

The housing member 36 is secured to a central bushing 38 which is non-rotatably secured to the pintle 24 by a cap screw 40. The housing member 36 provides a pulley surface 42 for cooperation with a flexible steel band or belt 44. One end of the band 44 is anchored to the pulley, as by a screw 46 (Fig. 1), while the other end thereof is attached to a reciprocatory air motor stem 50 through a suitable adjustable connection 52.

The stem 50, as best shown in Fig. 2, extends through a guiding bearing bushing 54. The upper end of the stem 50 is secured to the central portion of a flexible diaphragm 56, the diaphragm being clamped between a pair of stampings 58, 59. The peripheral edge of the flexible diaphragm 56, which may be of rubber or a suitable rubber substitute, is clamped between the flanges 60, 61 of a pair of cup-shaped elements 62, 63, the flanges being secured together by a plurality of bolts 64 to form a sealed diaphragm chamber. The lower element 62 is secured to a supporting bracket 66 in any suitable manner, the bracket 66 being secured to the valve casing 12 by cap screws 68.

The space within the valve casing 12 on the cabin side of the butterfly valve 22 communicates with a T 70, through a passageway 72. One branch of the T 70 is connected by conduit 74 and elbow fitting 76 to a space A within the cup cylinder member 63 beneath the diaphragm 56. The other branch of the T 70 communicates by way of conduit 78 with a pilot valve unit 80.

The space B within the cup member 62 and above the diaphragm 56 communicates through an elbow 82 and conduit 84 with a T 86. One of the other branches of the T 86 communicates through a conduit 88 with the pilot valve unit 80, while the third branch of the T 86 communicates through a conduit 90 with a manually operable pressure relief valve 92. A T 94 has one of its branches connected by conduit 96 with the atmosphere, through a suitable fitting 98 extending through the skin 18 of the cabin. The second branch of the T 94 is connected by a conduit 100 with the manually operable valve 92, while the third branch of the T 94 is connected by a conduit 102 with the pilot valve unit 80.

From the description thus far, it will be seen that the pressure within the cabin is exerted through the passageway 72, T 70, conduit 74, and elbow 76 to the space A beneath the diaphragm 56 of the air motor, and that when the pressure within the space A exceeds that within the space B by a predetermined amount, the diaphragm 56 will be pushed upwardly and through its stem 50 and band 44, rotate the butterfly valve 22 counterclockwise (Fig. 1). Thus, the position of the cabin valve 22 may be determined by controlling the pressure in the space B above the diaphragm. This is accomplished by means of the pilot valve mechanism 80.

The pilot valve mechanism comprises a body 110, which may be a die casting. The body is provided with a passageway 112 which is maintained at the pressure of the cabin since it is connected thereto through conduit 78. The connection between the conduit 78 and passageway 112 is provided in part by a bushing 114, which includes a dust screen 116. A port 118 is suitably connected to the conduit 88 and thus communicates with the space B above the diaphragm 56 of the cabin valve air motor. A passageway 120 is at all times in communication with the atmosphere since it is suitably connected to the conduit 102.

The pilot valve mechanism includes an isobaric bellows 124 which is evacuated, this bellows having a movable head 126 and an adjustable fixed head 128. Spring seats 130 and 132 are secured to the heads 126 and 128, respectively, retaining between them a compression coil spring 134. The bellows 124 is secured within a cap 136, which is clamped in air-tight relationship to the body 110.

An adjusting screw 140 is threaded in the head 128 and has a flanged head 142 rotatably mounted in the end of the cap 136, the screw being adapted to be clamped in adjusted position by a plate 144, which may be tightly pressed against the flanged head 142 by tightening screws 146. A protecting and sealing cover 148 is suitably secured over the end of the cap 136. The head 126 is prevented from rotating relative to the cap 136 by a stud 149 fixed in the head 128 and longitudinally slidable through a suitable opening in the end of the cap 136. When the pressure surrounding the bellows 124 is greater than a predetermined value, for example, the normal atmospheric pressure at 8000 feet altitude, the peripheral edge portion of the spring seat 130 rests against the lower end of the cap 136, as shown in Fig. 1, and it is only when the pressure surrounding the bellows 124 is less than the predetermined value for which the bellows is adjusted that the spring 134 expands the bellows.

An isobaric piston valve 150 is formed at the end of a stem 152, and the latter is secured to the lower head 126 of the bellows so as to move therewith. The piston valve 150 operates in a valve sleeve 154, the upper portion of which is in communication with the passageway 112 through a port 156, while the lower end portion of the valve sleeve 154 communicates freely with the passageway 120 and is thus maintained at atmospheric pressure. The space surrounding the bellows 124 is maintained at cabin pressure, since this space communicates with the passageway 112 through a duct 158.

A differential bellows 160 has a head 162 sealing its upper end, while its lower end has an outwardly extending flange which is clamped, in suitably sealed relationship, between a closure cap 164 and the bottom of the pilot valve body 110. A differential piston valve 168 is formed at the end of the stem 170, the stem being suitably secured to the head 162. A helical spring 172 is compressed between the head 162 and a spring seat 174, the latter being carried by an adjusting screw 176, which is threaded in a suitable bushing 177 secured in the spring seat 174. The screw 176 is freely rotatable in the cap 164 and is adapted to be clamped in adjusted position by a nut 178, a gasket 180 forming a seal around the screw. The space inside the differential bellows 160, as well as the space within the lower cap 164, is maintained at atmospheric pressure through a passageway 182 and a drilled hole 184, the outer end of which is plugged and the inner end of which connects with passageway 120.

The piston valve 150 cooperates with a port 186 in the valve sleeve 154, the latter being in registry with a T-shaped passageway 188 leading to the space surrounding the differential bellows 160 and to the space within a valve sleeve 190 below the piston valve 168. The space above the piston 168 communicates through a passageway 192 with the passageway 120, and is thus at atmospheric pressure at all times.

The manually operated pressure relief valve 92 is provided with an operating handle 194, this handle being normally in the position shown in Fig. 1, in which position the valve is closed. It is only when it is desired to reduce the pressure within the cabin substantially to atmospheric pressure, as when the plane is engaging the enemy, or whenever for any other reason it is desired that the cabin be not supercharged, that the valve handle 194 is manually operated to open the valve 92.

The operation of the apparatus may best be understood by reference to the graphs of Figs. 5 and 6. As indicated by the legend, Fig. 5 represents the pressure conditions at various altitudes when the cabin is not supercharged. Under these conditions, the valve 92 is open, and hence the conduit 90, and space B above the diagraph 56 of the air motor, are maintained at atmospheric pressure.

In Fig. 5 the curve 200 represents the normal atmospheric pressure at different altitudes, while the curve 202 represents the pressure within the cabin. It will be noted that these curves show that under the given conditions, the pressure within the cabin is maintained at a value of .25″ Hg above the atmospheric pressure at all altitudes. This is accomplished in the following manner.

Upon commencement of the operation of the supercharger, the pressure in the cabin tends to increase, and this increased pressure is transmitted through the passageway 72, T 70, conduit 74, and elbow 76 to the space A beneath the air motor diaphragm 56. Since the valve 92 is assumed to be open, the space B above the diaphragm 56 will be at atmospheric pressure, by virtue of its connection to the atmosphere through elbow 82, conduit 84, T 86, conduit 90, valve 92, conduit 100, T 94, and conduit 96. If it were not for the provision of the spring 30, the diaphragm 56 would tend to flex upwardly to the maximum extent and fully open the cabin valve 22. However, due to the resistance of the spring and the slight friction in the bearings for the valve 22, the pressure within the cabin must be .25″ Hg above atmospheric pressure before the cabin valve 22 will commence opening, and this pressure differential must be maintained to hold the valve 22 in open position. Any tendency for the cabin pressure to increase more than .25″ Hg above the pressure of the atmosphere, will further raise the diaphragm 56 and more widely open the valve 22, and conversely, any tendency of the cabin pressure to drop below a value of .25″ Hg above atmospheric pressure will result in downward movement of the diaphragm 56 and movement of the valve 22 toward closed position.

It will thus be clear that the pressure in the cabin will be .25″ Hg above atmospheric pressure at all altitudes. This pressure differential is negligible from the point of view of comfort of the crew, but is important in that it provides the source of motive power for the operation of the air motor comprising the diaphragm 56 and associated parts. Under these assumed conditions, the pressure in the cabin will, with changes in altitude of the plane, be of the values represented by the curve 202 of Fig. 5.

When it is desired to have the cabin supercharged, the valve 92 is closed. This has no effect upon the operation of the system between sea level and a pressure altitude of approximately 8000 feet (depending upon the adjustments of the system, particularly the adjusting screw 140), since the isobaric bellows 124 and the differential bellows 160 remain in the positions in which they are shown in Fig. 1 substantially throughout this range of atmospheric pressure, and therefore the space B above the diaphragm 56 is connected to the atmosphere through the series of passageways traced as follows: Elbow 82, conduit 84, T 86, conduit 88, passageway 118, top portion of T-shaped passageway 188, port 186, passageway 120, conduit 102, T 94, and conduit 96.

When a pressure altitude of approximately 8000 feet (22.5″ Hg) is attained, the isobaric bellows 124 commences expanding, and through its piston valve 150, partially cuts off communication between atmospheric pressure passageway 120 at the port 186 and partially opens a path for the flow of air from the cabin pressure passageway 112 through the port 186 and thence through the port 118 to the space above the diaphragm 56.

The length of the piston valve 150 is less than the diameter of the port 186 so that the piston 150 will attain an equilibrium position substantially central with respect to the port 186, at which the pressure in the space B is such that the cabin pressure will be maintained at the pressure altitude of approximately 8000 feet, namely, about 22.5″ Hg, as is shown by the initial portion of the curve 210 of Fig. 6. As the airplane ascends from the 8000 foot to the 35,000 foot altitude, this condition will be maintained, that is, the isobaric bellows 124 will maintain the cabin at a pressure of approximately 22.5″ Hg.

As the plane reaches the 35,000 foot altitude, the differential bellows 160 begins to be compressed, since its interior is maintained at atmospheric pressure while the pressure of the air surrounding it is maintained approximately constant.

Thus, at the 35,000 foot altitude, the piston 168 commences moving downwardly and uncovers the upper portion of the port 118, thus providing a restricted path to the atmosphere from the space B. This path may be traced through the conduit 84, T 86, conduit 88, port 118, passageways 192 and 120, and conduit 102. The lowering of the pressure within the space B results in further opening of the cabin valve 22 and consequent tendency to reduce the cabin pressure as the atmospheric pressure is reduced, but maintaining the cabin pressure approximately 15.5″ Hg above atmospheric pressure. Such reduction of the cabin air pressure with decreased atmospheric pressure, above the altitude of 35,000 feet, results in avoiding the necessity of placing an undue load upon the supercharger and makes it unnecessary to design the cabin to withstand pressure difference greater than 15.5″ Hg, while nevertheless maintaining the pressure within the cabin sufficiently high for the reasonable comfort of the crew.

When the cabin is supercharged and the airplane becomes engaged in action with the enemy, or if for any other reason it is found desirable to permit the cabin pressure to drop to atmospheric pressure, the valve 92 will be opened, whereupon the cabin pressure will rapidly drop approximately to atmospheric pressure.

Since the pilot valve mechanism 80 and the reciprocatory diaphragm motor are sealed, and are connected to the cabin and to the atmosphere only through the various conduits, it will be clear that the various parts of the system may be located either within the supercharged cabin or in any other suitable available space, without in any way affecting the character of the operation of the system. This is of considerable advantage, especially in military aircraft, where space is at a premium. The apparatus is also very light in weight, and since the power for its operation is derived from the supercharger, by virtue of the pressure differential between the cabin and the atmosphere, no auxiliary power supplying means is required, nor does the apparatus contain any electrical parts which would constitute a load upon the electrical generating system of the aircraft.

The apparatus is entirely automatic in operation and the integral parts thereof are simple in construction and may, when feasible, be arranged very compactly. The power available for the operation of the parts is greatly in excess of that required, so that changes in the degree of friction due to wear, the presence of foreign particles, or due to large changes in temperature, do not interfere with the operation.

While I have shown and described a particular embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

In an apparatus for controlling the pressure in a supercharged cabin in an aircraft, in which there is a ventilating opening from the cabin to the atmosphere, the combination of an adjustable position valve forming the sole means for controlling the flow of air through said opening, a differentially positionable air motor operatively connected to said valve, said air motor having a diaphragm with one side subjected to the pressure in said cabin, and a pilot valve mechanism controlling the air pressure on the other side of said diaphragm, said mechanism comprising an isobaric pressure bellows, means forming a fluid conduit connection from said bellows to the cabin, proportioning valve means connected for operation by said isobaric bellows, means forming fluid conduit connections from said proportioning valve means to the atmosphere, to the cabin and to the other side of said diaphragm, said proportioning valve means being adapted upon movement to change the pressure drop of the connection therethrough from said other side of said diaphragm to the atmosphere and simultaneously inversely to change the pressure drop of the connection therethrough from said other side of said diaphragm to the cabin, a second valve and a fluid conduit connection associated therewith between said other side of said diaphragm and the cabin and between the other side of said diaphragm and the atmosphere, a differential pressure bellows connected for operating said second valve, means forming a fluid conduit connection between the space on one side of said differential bellows and the atmosphere, and means forming a fluid conduit connection from the other side of said differential bellows to the cabin by way of said isobaric pressure operated valve at pressure altitudes of the order of 35,000 feet.

WILLIAM A. MARSHALL, Jr.

REFERENCES CITED

The following references are of record in the file of this patent:

UNITED STATES PATENTS

| Number | Name | Date |
|---|---|---|
| 2,208,554 | Price | July 16, 1940 |
| 2,316,416 | Gregg | Apr. 13, 1943 |
| 2,002,057 | Gregg | May 21, 1935 |
| 2,342,220 | Price | Feb. 22, 1944 |
| 2,358,835 | Streid | Sept 26, 1944 |
| 2,391,197 | Schwien | Dec. 18, 1945 |
| 1,826,202 | Cole | Oct. 6, 1931 |
| 1,095,209 | Humphrey | May 5, 1914 |
| 1,575,725 | Stewart | Mar. 9, 1926 |
| 2,413,027 | Maxson | Dec. 24, 1946 |

FOREIGN PATENTS

| Number | Country | Date |
|---|---|---|
| 521,623 | Great Britain | May 27, 1940 |

OTHER REFERENCES

Pressurized Cabin Control, by Tinker et al., Aviation, Jan. 1941, pages 38, 119, 124.